US012600421B2

(12) United States Patent
Ishimura

(10) Patent No.: US 12,600,421 B2
(45) Date of Patent: Apr. 14, 2026

(54) TRAVELING DEVICE

(71) Applicant: SHARP KABUSHIKI KAISHA, Sakai City (JP)

(72) Inventor: Ryoji Ishimura, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 19/095,327

(22) Filed: Mar. 31, 2025

(65) Prior Publication Data

US 2025/0313290 A1 Oct. 9, 2025

(30) Foreign Application Priority Data

Apr. 4, 2024 (JP) ................................ 2024-060634

(51) Int. Cl.
  *B62D 61/10* (2006.01)
  *B62D 49/06* (2006.01)
(52) U.S. Cl.
  CPC ......... *B62D 61/10* (2013.01); *B62D 49/0621* (2013.01)
(58) Field of Classification Search
  CPC ............................ B62D 61/10; B62D 49/0621
  USPC ........................................................ 180/23
  See application file for complete search history.

(56) References Cited

U.S. PATENT DOCUMENTS 4,840,394 A * 6/1989 Bickler .................... B60G 5/01
                                                        280/682
8,695,737 B2 * 4/2014 Ohruh .................. A61G 5/1089
                                                        280/304.2
8,851,214 B2 * 10/2014 Mirzaie .................. A61G 5/043
                                                        180/907
10,065,690 B2 * 9/2018 Summer .............. B62D 55/075
11,312,196 B2 * 4/2022 Isono ...................... B60G 7/006
11,903,887 B2 * 2/2024 Bekoscke .............. A61G 5/043
12,358,579 B2 * 7/2025 Komura ................. B62D 61/10

FOREIGN PATENT DOCUMENTS

JP      2019-204538 A      11/2019
JP      2023006068 A   *   1/2023
JP      2023144780 A   *   10/2023

OTHER PUBLICATIONS

English Translation Yamanaka (Year: 2023).*

* cited by examiner

*Primary Examiner* — Paul N Dickson
*Assistant Examiner* — Caitlin Anne Miller
(74) *Attorney, Agent, or Firm* — ScienBiziP, P.C.

(57) ABSTRACT

A traveling device includes a first left side wheel, a second left side wheel, a third left side wheel, a first right side wheel, a second right side wheel, a third right side wheel, a first front left side link member, a second front left side link member, a third left side link member, a second rear left side link member, a first rear left side link member, a first front right side link member, a second front right side link member, a third right side link member, a second rear right side link member, and a first rear right side link member. A front left side rotation member is arranged on the second front left side link member, a rear left side rotation member is arranged on the second rear left side link member, a front right side rotation member is arranged on the second front right side link member, and a rear right side rotation member is arranged on the second rear right side link member.

4 Claims, 13 Drawing Sheets

TRAVELING DEVICE

INCORPORATION BY REFERENCE

This application is based upon and claims the benefit of priority from the corresponding Japanese Patent Application No. 2024-060634 filed on Apr. 4, 2024, the entire contents of which are incorporated herein by reference.

BACKGROUND

The present disclosure relates to a traveling device.

There is a known traveling device that includes a traveling wheel and travels while loading luggage or travels while towing a cart loaded with luggage.

However, it cannot be said that the known technique is sufficient in traveling stability of the traveling device, for example, when a step on a floor surface is large or a load is large.

SUMMARY

An object of the present disclosure is to provide a traveling device that can improve traveling stability of a traveling device.

A traveling device according to one aspect of the present disclosure includes: a first left side wheel, a second left side wheel, and a third left side wheel arranged in a front-rear direction on a left side of a vehicle body; a first right side wheel, a second right side wheel, and a third right side wheel arranged in a front-rear direction on a right side of the vehicle body; a left side link member that connects the first left side wheel, the second left side wheel, and the third left side wheel; and a right side link member that connects the first right side wheel, the second right side wheel, and the third right side wheel. The left side link member includes a first left side link member extending in a front-rear direction, a second left side link member connected to the first left side link member and extending in a left-right direction, a third left side link member connected to the second left side link member, and a left side rotation member arranged on the second left side link member. The right side link member includes a first right side link member extending in the front-rear direction, a second right side link member connected to the first right side link member and extending in the left-right direction, a third right side link member connected to the second right side link member, and a right side rotation member arranged on the second right side link member. Two of the first left side wheel, the second left side wheel, and the third left side wheel are connected to the first left side link member, and a remaining one is connected to the third left side link member. Two of the first right side wheel, the second right side wheel, and the third right side wheel are connected to the first right side link member, and a remaining one is connected to the third right side link member. The left side rotation member and the right side rotation member are attached to a frame of the vehicle body.

According to the present disclosure, it is possible to provide a traveling device that can improve traveling stability of a traveling device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments of the present disclosure will be described below with reference to the drawings. Note that the following embodiments are specific examples of the present disclosure, and do not limit the technical scope of the present disclosure.

Figure 1:
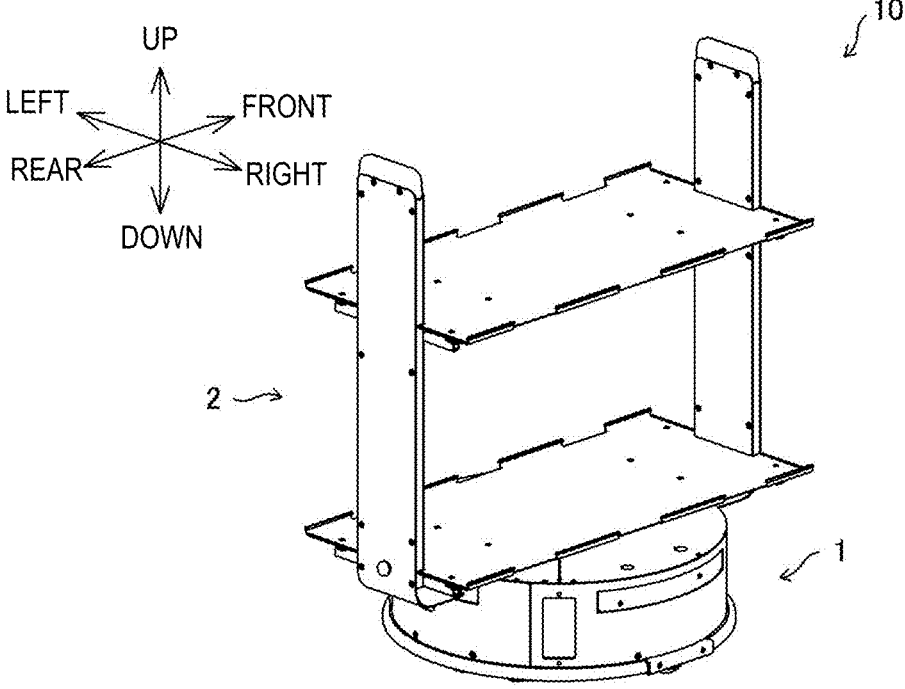
FIG. 1 is a perspective view illustrating an overall configuration of a traveling device according to an embodiment of the present disclosure.
Figure 2:
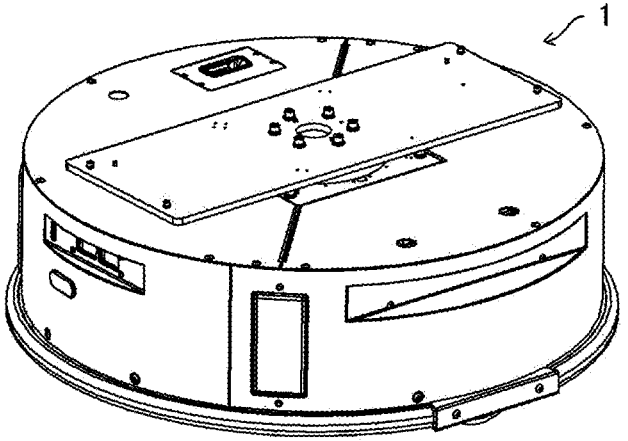
FIG. 2 is a perspective view illustrating an overall configuration of a traveling unit according to the embodiment of the present disclosure.
Figure 3:
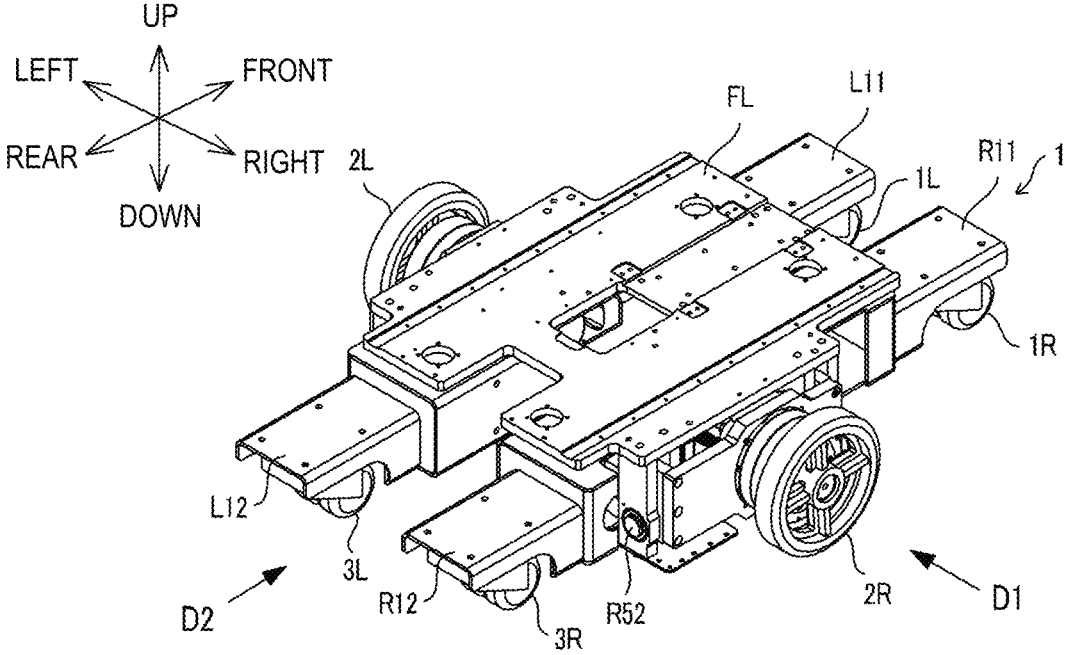
FIG. 3 is a perspective view illustrating an internal structure of the traveling unit according to the embodiment of the present disclosure.

FIG. 1 is a perspective view illustrating an overall configuration of a traveling device 10 according to an embodiment of the present disclosure. The traveling device 10 is, for example, an automatic guided vehicle, and includes a traveling unit 1 and a shelf 2 connected to the traveling unit 1. FIG. 2 is a perspective view illustrating an overall configuration of the traveling unit 1.

The shelf 2 is a storage shelf that can store a conveyance target object conveyed by the traveling device 10. For example, the shelf 2 is placed on and connected to the top of the traveling unit 1. As another embodiment, the shelf 2 may include a cart having a wheel, and may be towably connected to the traveling unit 1.

The traveling unit 1 has a circular outer shape in top view (see FIG. 2), and can perform turning travel (spin turn) of turning at the spot in addition to forward travel and backward travel. As illustrated in FIG. 2, the top of the traveling unit 1 has a configuration in which the shelf 2 can be connected. The top of the traveling unit 1 may include a coupler (such as a hook) to which the cart can be coupled. The traveling unit 1 may include a sensor that detects an obstacle or the like. The traveling unit 1 may have a function of automatically traveling (autonomously traveling) a preset travel route while detecting an obstacle, for example.

Figure 4:
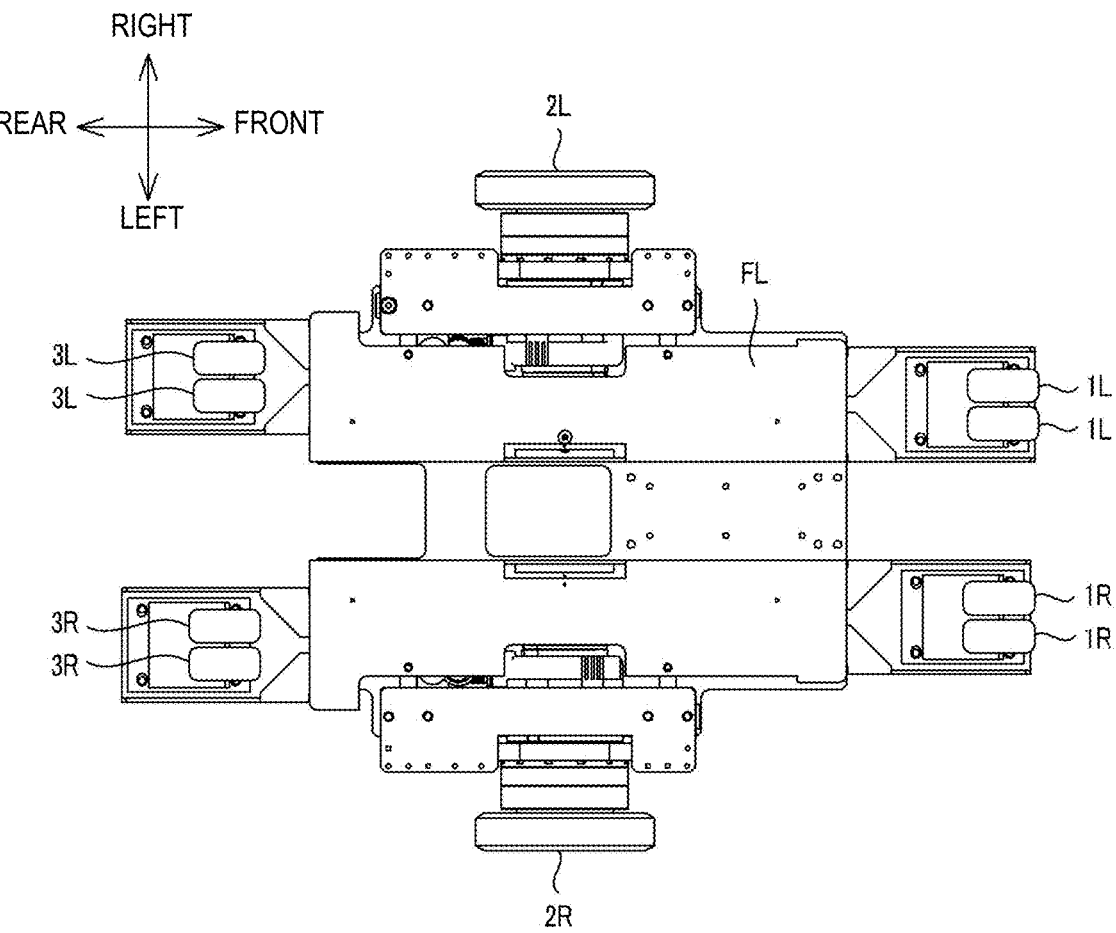
FIG. 4 is a plan view illustrating an internal structure of the traveling unit according to the embodiment of the present disclosure.
Figure 5:
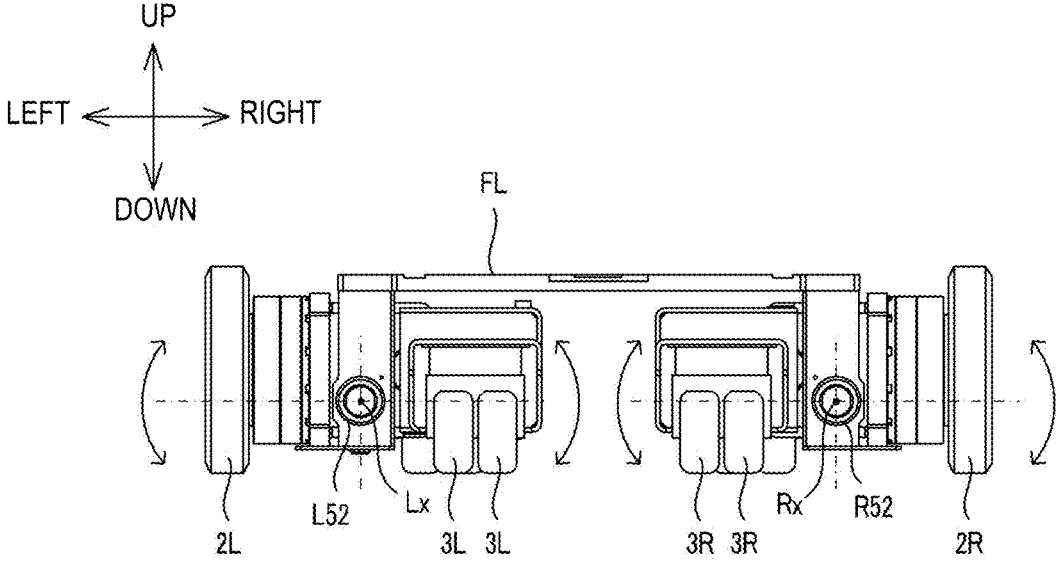
FIG. 5 is a rear view illustrating an internal structure of the traveling unit according to the embodiment of the present disclosure.
Figure 6:
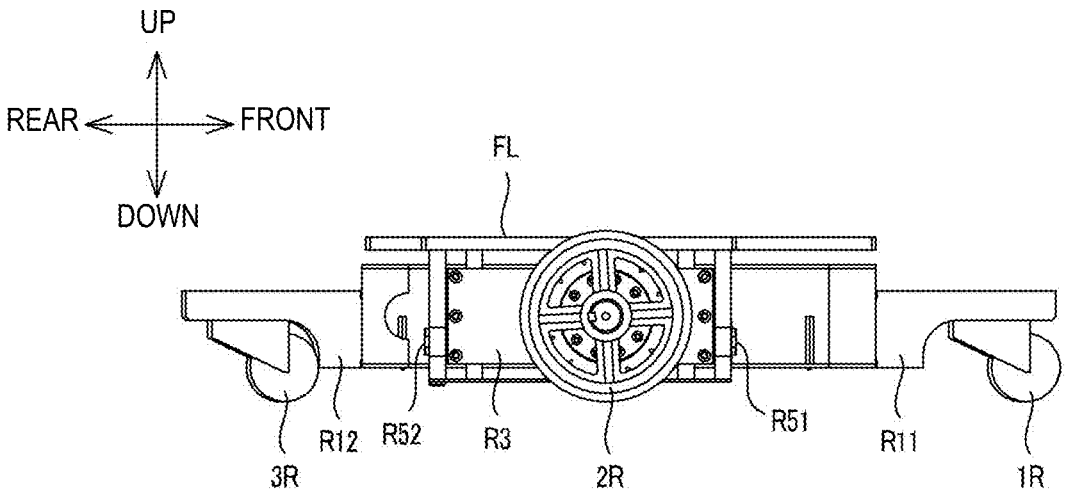
FIG. 6 is a side view illustrating an internal structure of the traveling unit according to the embodiment of the present disclosure.

FIGS. 3 to 6 illustrate examples of an internal structure in which an exterior cover of the traveling unit 1 is omitted. FIG. 4 is a plan view of the internal structure, FIG. 5 is a rear view of the internal structure as viewed from a D2 direction (see FIG. 3), and FIG. 6 is a side view of the internal structure as viewed from a D1 direction (see FIG. 3).

The traveling unit 1 includes a first left side wheel 1L, a second left side wheel 2L, and a third left side wheel 3L arranged in a front-rear direction on a left side of a vehicle body, and a first right side wheel 1R, a second right side wheel 2R, and a third right side wheel 3R arranged in the front-rear direction on the right side of the vehicle body. The first left side wheel 1L, the second left side wheel 2L, and the third left side wheel 3L are arranged in this order from the front toward the rear on the left side of the vehicle body, and the first right side wheel 1R, the second right side wheel 2R, and the third right side wheel 3R are arranged in this order from the front toward the rear on the right side of the vehicle body.

For example, the first left side wheel 1L is arranged on a left side front of the traveling unit 1, the second left side wheel 2L is arranged on a left center of the traveling unit 1, and the third left side wheel 3L is arranged on a left side rear of the traveling unit 1. The first right side wheel 1R is arranged on a right side front of the traveling unit 1, the second right side wheel 2R is arranged on a right center of the traveling unit 1, and the third right side wheel 3R is arranged on a right side rear of the traveling unit 1.

The second left side wheel 2L and the second right side wheel 2R are driving wheels, and the first left side wheel 1L, the third left side wheel 3L, the first right side wheel 1R, and the third right side wheel 3R are driven wheels. The driving wheels are driven by a motor driven by electric power supplied from a battery.

The second left side wheel 2L is arranged further on the left side of the vehicle body than the first left side wheel 1L and the third left side wheel 3L with respect to a traveling direction, and the second right side wheel 2R is arranged further on the right side of the vehicle body than the first right side wheel 1R and the third right side wheel 3R with respect to the traveling direction. That is, among the first left side wheel 1L, the second left side wheel 2L, and the third left side wheel 3L, the second left side wheel 2L is arranged on the outermost left side of the vehicle body, and among the first right side wheel 1R, the second right side wheel 2R, and the third right side wheel 3R, the second right side wheel 2R is arranged on the outermost right side of the vehicle body. The first left side wheel 1L and the third left side wheel 3L are arranged on a straight line in a direction parallel to the traveling direction, and the first right side wheel 1R and the third right side wheel 3R are arranged on a straight line in a direction parallel to the traveling direction. As another embodiment, the first left side wheel 1L and the third left side wheel 3L may be offset in the left-right direction, and the first right side wheel 1R and the third right side wheel 3R may be offset in the left-right direction.

According to the above configuration, for example, by rotationally driving the second left side wheel 2L in a forward direction and rotating the second right side wheel 2R in a backward direction, it is possible to cause the traveling unit 1 to perform a spin turn clockwise. By rotationally driving the second left side wheel 2L in the backward direction and rotating the second right side wheel 2R in the forward direction, it is possible to cause the traveling unit 1 to perform a spin turn counterclockwise.

In the traveling unit 1, the first left side wheel 1L, the second left side wheel 2L, and the third left side wheel 3L are fixed to a left side link member (L11, L12, and the like), and the first right side wheel 1R, the second right side wheel 2R, and the third right side wheel 3R are fixed to a right side link member (R11, R12, and the like). The left side link member and the right side link member are fixed to a common link member FL connected to the vehicle body via a rotation member (L52 and R52). That is, the traveling unit 1 includes a link mechanism that connects the wheels by the link members. As illustrated in FIG. 5, the first left side wheel 1L, the third left side wheel 3L, and the second left side wheel 2L are connected to each other by a left side rotation member (a front left side rotation member L51 and a rear left side rotation member L52 described later) so as to be rotatable in the left-right direction with respect to the vehicle body about a left side rotation shaft Lx (the arrow direction in FIG. 5), and the first right side wheel 1R, the third right side wheel 3R, and the second right side wheel 2R are connected to each other by a right side rotation member (a front right side rotation member R51 and a rear right side rotation member R52 described later) so as to be rotatable in the left-right direction with respect to the vehicle body about a right side rotation shaft Rx (the arrow direction in FIG. 5).

Figure 7:
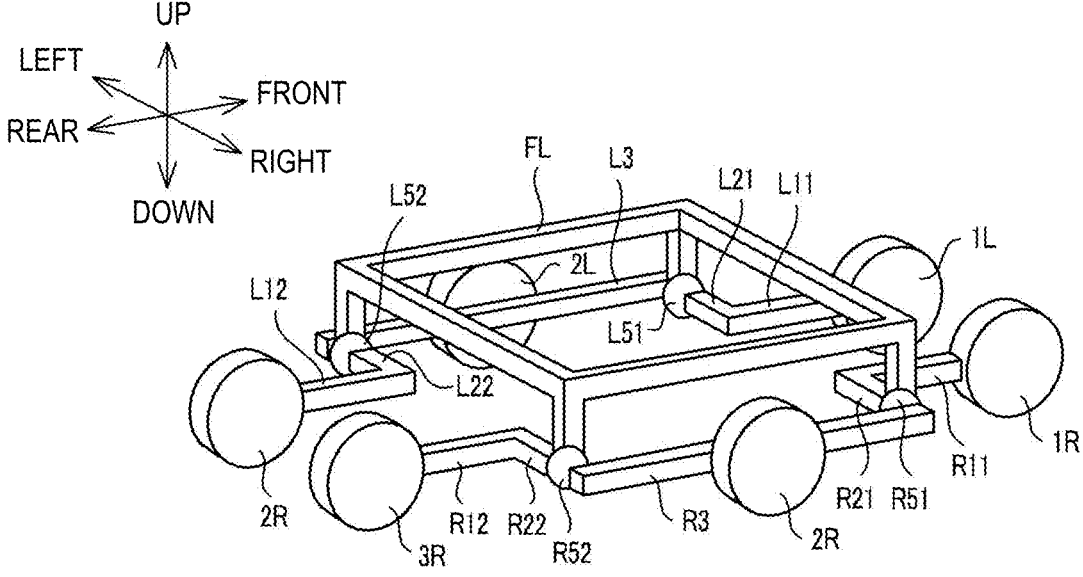
FIG. 7 is a schematic diagram illustrating a link mechanism of the traveling unit according to the embodiment of the present disclosure.
Figure 8:
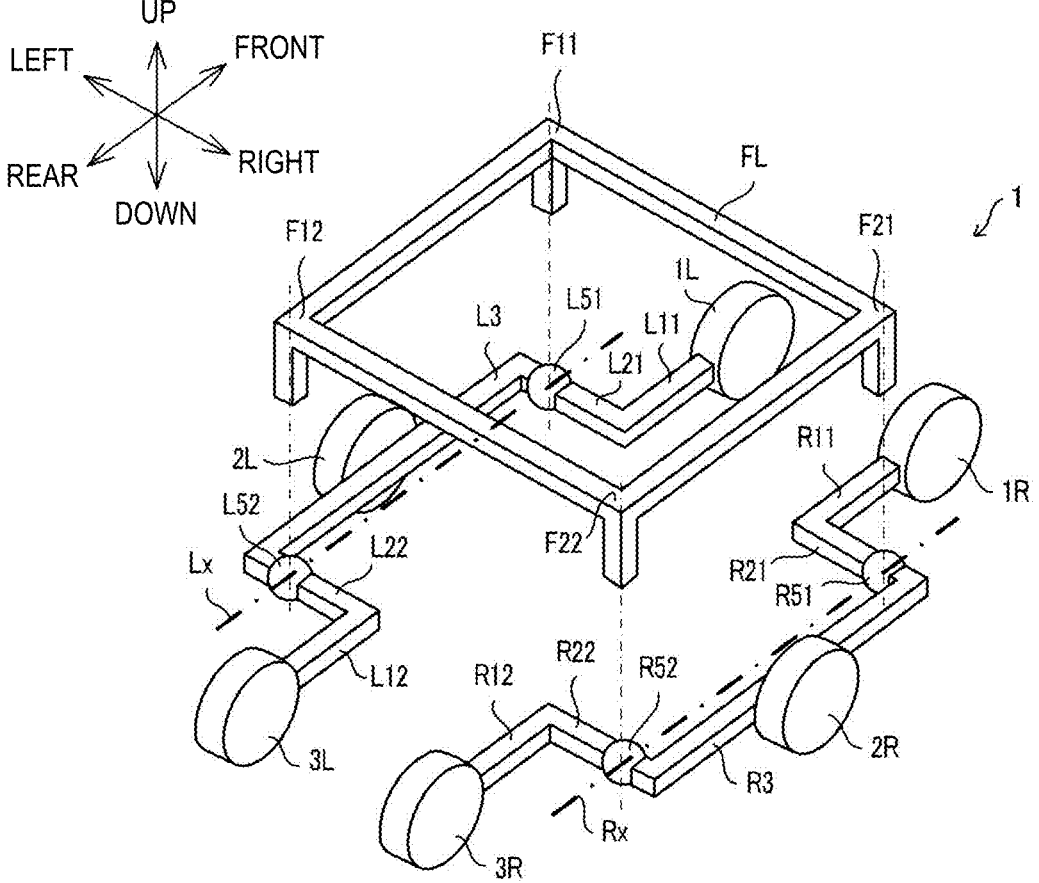
FIG. 8 is a schematic diagram illustrating the link mechanism of the traveling unit according to the embodiment of the present disclosure.
Figure 9:
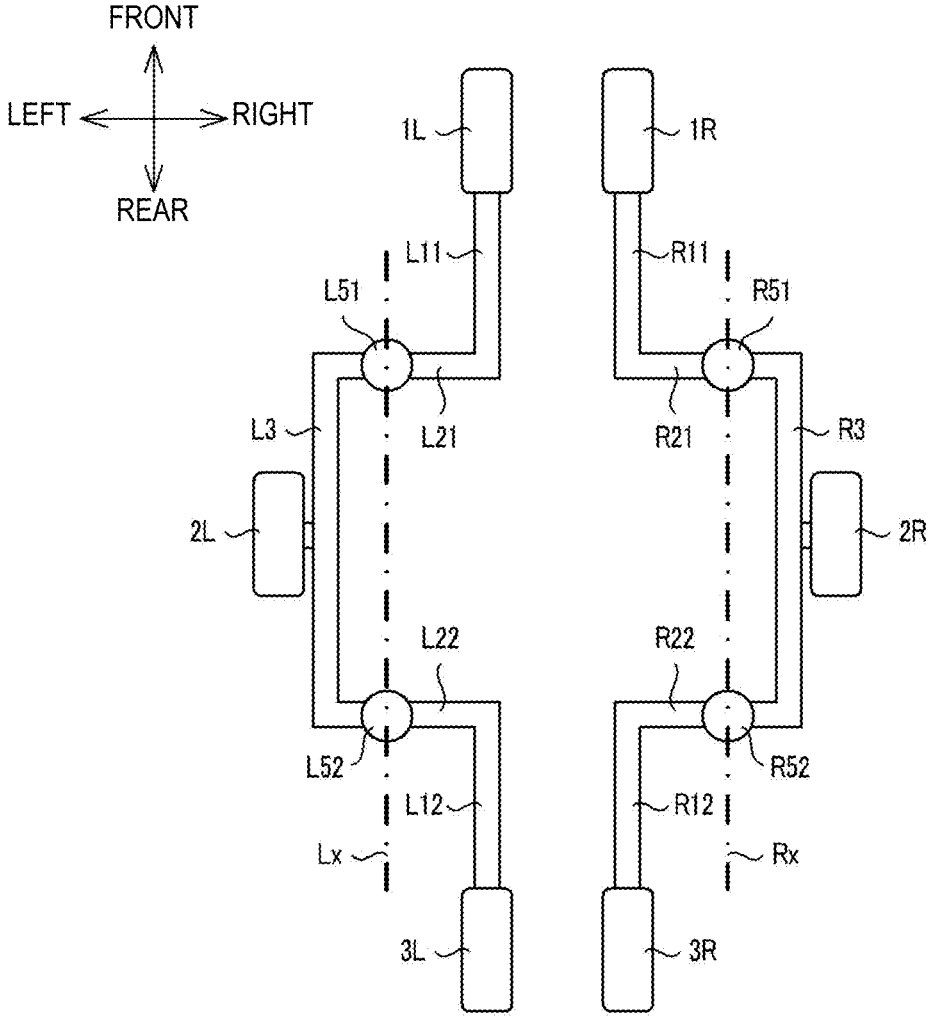
FIG. 9 is a plan view illustrating the link mechanism of the traveling unit according to the embodiment of the present disclosure.

Hereinafter, a specific configuration of the link mechanism will be described. FIG. 7 is a schematic diagram of the link mechanism of the traveling unit 1. FIG. 8 is an exploded perspective view of the common link member FL. FIG. 9 is a plan view of the link mechanism excluding the common link member FL.

The traveling unit 1 includes the left side link member that connects the first left side wheel 1L, the second left side wheel 2L, and the third left side wheel 3L, and the right side link member that connects the first right side wheel 1R, the second right side wheel 2R, and the third right side wheel 3R.

The left side link member includes a first front left side link member L11 arranged on a front side of the vehicle body and extending in the front-rear direction, a second front left side link member L21 arranged on the front side of the vehicle body, connected to the first front left side link member L11, and extending in the left-right direction, a third left side link member L3 connected to the second front left side link member L21 and extending in the front-rear direction, a second rear left side link member L22 arranged on a rear side of the vehicle body, connected to the third left side link member L3, and extending in the left-right direction, and a first rear left side link member L12 arranged on the rear side of the vehicle body, connected to the second rear left side link member L22, and extending in the front-rear direction.

The front left side rotation member L51 is arranged on the second front left side link member L21, and the rear left side rotation member L52 is arranged on the second rear left side link member L22. Specifically, as illustrated in FIG. 9, the front left side rotation member L51 is arranged between a connection (one end of the second front left side link member L21) between the second front left side link member L21 and the first front left side link member L11 and a connection (the other end of the second front left side link member L21) between the second front left side link member L21 and the third left side link member L3, and the rear left side rotation member L52 is arranged between a connection (one end of the second rear left side link member L22) between the second rear left side link member L22 and the first rear left side link member L12 and a connection (the other end of the second rear left side link member L22) between the second rear left side link member L22 and the third left side link member L3. The front left side rotation member L51 may be arranged, for example, on the left side in the left-right direction of the second front left side link member L21 (the second left side wheel 2L side), or may be arranged near the center in the left-right direction of the second front left side link member L21. The rear left side rotation member L52 may be arranged, for example, on the left side in the left-right direction of the second rear left side link member L22 (the second left side wheel 2L side), or may be arranged near the center in the left-right direction of the second rear left side link member L22.

As illustrated in FIGS. 8 and 9, the front left side rotation member L51 and the rear left side rotation member L52 are rotatably connected to the common link member FL. As illustrated in FIG. 8, the common link member FL includes one frame. A front left side end F11 of the common link member FL is connected to the front left side rotation member L51, and a rear left side end F12 of the common link member FL is connected to the rear left side rotation member L52. That is, the front left side rotation member L51 and the rear left side rotation member L52 are connected to the common link member FL so as to be rotatable in the left-right direction with respect to the vehicle body about the common left side rotation shaft Lx extending in the front-rear direction.

This enables the first front left side link member L11, the second front left side link member L21, the third left side link member L3, the second rear left side link member L22, and the first rear left side link member L12 to rotate in the left-right direction with respect to the vehicle body about the left side rotation shaft Lx by the front left side rotation member L51 and the rear left side rotation member L52. Therefore, the first left side wheel 1L and the third left side wheel 3L arranged further on the right side than the left side rotation shaft Lx and the second left side wheel 2L arranged further on the left side than the left side rotation shaft Lx are rotatable in the left-right direction with respect to the vehicle body about the left side rotation shaft Lx (see FIG. 5).

The right side link member includes a first front right side link member R11 arranged on the front side of the vehicle body and extending in the front-rear direction, a second front right side link member R21 arranged on the front side of the vehicle body, connected to the first front right side link member R11, and extending in the left-right direction, a third right side link member R3 connected to the second front right side link member R21 and extending in the front-rear direction, a second rear right side link member R22 arranged on the rear side of the vehicle body, connected to the third right side link member R3, and extending in the left-right direction, and a first rear right side link member R12 arranged on the rear side of the vehicle body, connected to the second rear right side link member R22, and extending in the front-rear direction.

The front right side rotation member R51 is arranged on the second front right side link member R21, and the rear right side rotation member R52 is arranged on the second rear right side link member R22. Specifically, as illustrated in FIG. 9, the front right side rotation member R51 is arranged between a connection (one end of the second front right side link member R21) between the second front right side link member R21 and the first front right side link member R11 and a connection (the other end of the second front right side link member R21) between the second front right side link member R21 and the third right side link member R3, and the rear right side rotation member R52 is arranged between a connection (one end of the second rear right side link member R22) between the second rear right side link member R22 and the first rear right side link member R12 and a connection (the other end of the second rear right side link member R22) between the second rear right side link member R22 and the third right side link member R3. The front right side rotation member R51 may be arranged, for example, on the right side in the left-right direction of the second front right side link member R21 (the second right side wheel 2R side), or may be arranged near the center in the left-right direction of the second front right side link member R21. The rear right side rotation member R52 may be arranged, for example, on the right side in the left-right direction of the second rear right side link member R22 (the second right side wheel 2R side), or may be arranged near the center in the left-right direction of the second rear right side link member R22.

As illustrated in FIGS. 8 and 9, the front right side rotation member R51 and the rear right side rotation member R52 are rotatably connected to the common link member FL. As illustrated in FIG. 8, a front right side end F21 of the common link member FL is connected to the front right side rotation member R51, and a rear right side end F22 of the common link member FL is connected to the rear right side rotation member R52. That is, the front right side rotation member R51 and the rear right side rotation member R52 are connected to the common link member FL so as to be rotatable in the left-right direction with respect to the vehicle body about the common right side rotation shaft Rx extending in the front-rear direction.

This enables the first front right side link member R11, the second front right side link member R21, the third right side link member R3, the second rear right side link member R22, and the first rear right side link member R12 to rotate in the left-right direction with respect to the vehicle body about the right side rotation shaft Rx by the front right side rotation member R51 and the rear right side rotation member R52. Therefore, the first right side wheel 1R and the third right side wheel 3R arranged further on the left side than the right side rotation shaft Rx and the second right side wheel 2R arranged further on the right side than the right side rotation shaft Rx are rotatable in the left-right direction with respect to the vehicle body about the right side rotation shaft Rx (see FIG. 5).

As illustrated in FIG. 8, the ends (the front left side end F11, the rear left side end F12, the front right side end F21, and the rear right side end F22) of the common link member FL are connected to the respective rotation members (the front left side rotation member L51, the rear left side rotation member L52, the front right side rotation member R51, and the rear right side rotation member R52), and the common link member FL is fixed to the vehicle body of the traveling device 10.

As described above, the traveling unit 1 according to the present embodiment includes the link mechanism that can rotate, in the left-right direction, about one side rotation shaft (the left side rotation shaft Lx) extending in the front-rear direction, the left side wheel (the second left side wheel 2L) and the right side wheel (the first left side wheel 1L and the third left side wheel 3L), which are arranged apart from each other in the left-right direction on the left side of the vehicle body. The traveling unit 1 includes the link mechanism that can rotate, in the left-right direction, about one side rotation shaft (the right side rotation shaft Rx) extending in the front-rear direction, the left side wheel (the first right side wheel 1R and the third right side wheel 3R) and the right side wheel (the second right side wheel 2R), which are arranged apart from each other in the left-right direction on the right side of the vehicle body.

By this, the link mechanism can uniformly maintain the load distribution to the second left side wheel 2L, the first left side wheel 1L, and the third left side wheel 3L even when, for example, the floor surface has a step having a different height in the left-right direction on the left side of the vehicle body with respect to the traveling direction of the traveling device 10. Similarly, the link mechanism can uniformly maintain the load distribution to the second right side wheel 2R and the first right side wheel 1R and the third right side wheel 3R even when, for example, the floor surface has a step having a different height in the left-right direction on the right side of the vehicle body with respect to the traveling direction of the traveling device 10.

Furthermore, it is not necessary to increase the weight of the vehicle body for traveling stability of the traveling device 10, and therefore it is possible to reduce the size and weight of the traveling device 10.

Other Embodiments

The traveling device 10 according to the present disclosure is not limited to the above-described embodiment, and may assume the following embodiments.

Figure 10:
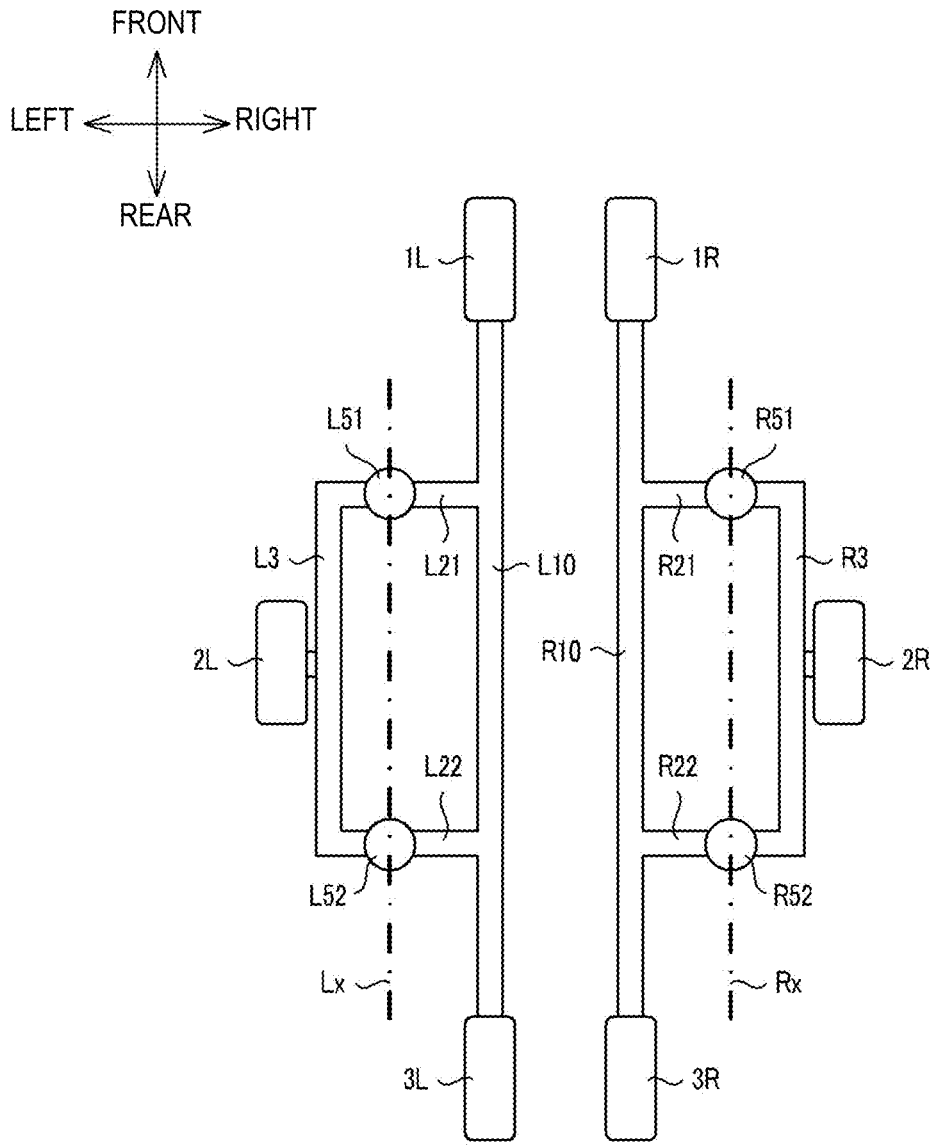
FIG. 10 is a plan view illustrating another example of the link mechanism of the traveling unit according to the embodiment of the present disclosure.

As another embodiment, for example, as illustrated in FIG. 10, the first front left side link member L11 and the first rear left side link member L12 may include one first left side link member L10, and the first front right side link member R11 and the first rear right side link member R12 may include one first right side link member R10. That is, the first left side wheel 1L and the third left side wheel 3L may be connected to the one first left side link member L10, and the first right side wheel 1R and the third right side wheel 3R may be connected to the one first right side link member R10. Alternatively, the second front left side link member L21 and the second rear left side link member L22 may include one link member, and the second front right side link member R21 and the second rear right side link member R22 may include one link member (not illustrated).

Figure 11:
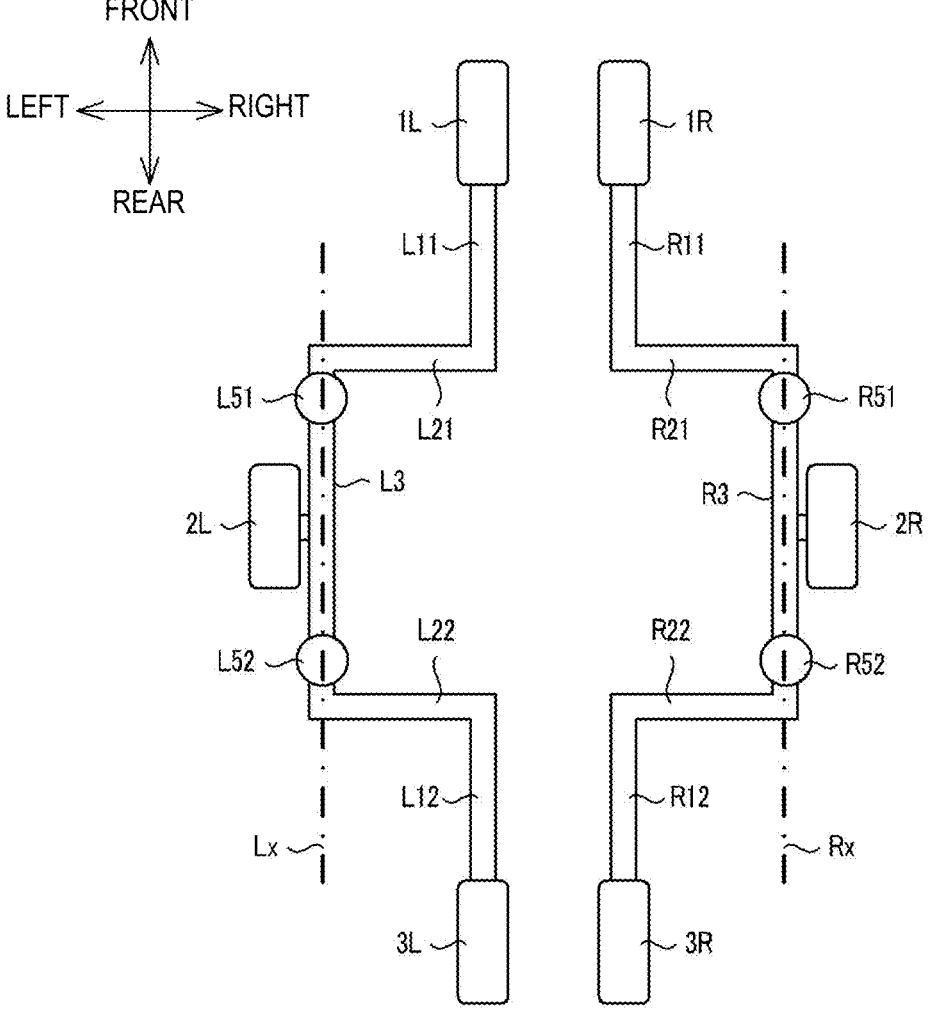
FIG. 11 is a plan view illustrating another example of the link mechanism of the traveling unit according to the embodiment of the present disclosure.

As still another embodiment, for example, as illustrated in FIG. 11, the front left side rotation member L51 and the rear left side rotation member L52 may be arranged on the third left side link member L3. For example, the front left side rotation member L51 is arranged on a front end side of the third left side link member L3, and the rear left side rotation member L52 is arranged on a rear end side of the third left side link member L3. Similarly, the front right side rotation member R51 and the rear right side rotation member R52 may be arranged on the third right side link member R3. For example, the front right side rotation member R51 is arranged on the front end side of the third right side link member R3, and the rear right side rotation member R52 is arranged on the rear end side of the third right side link member R3.

Figure 12:
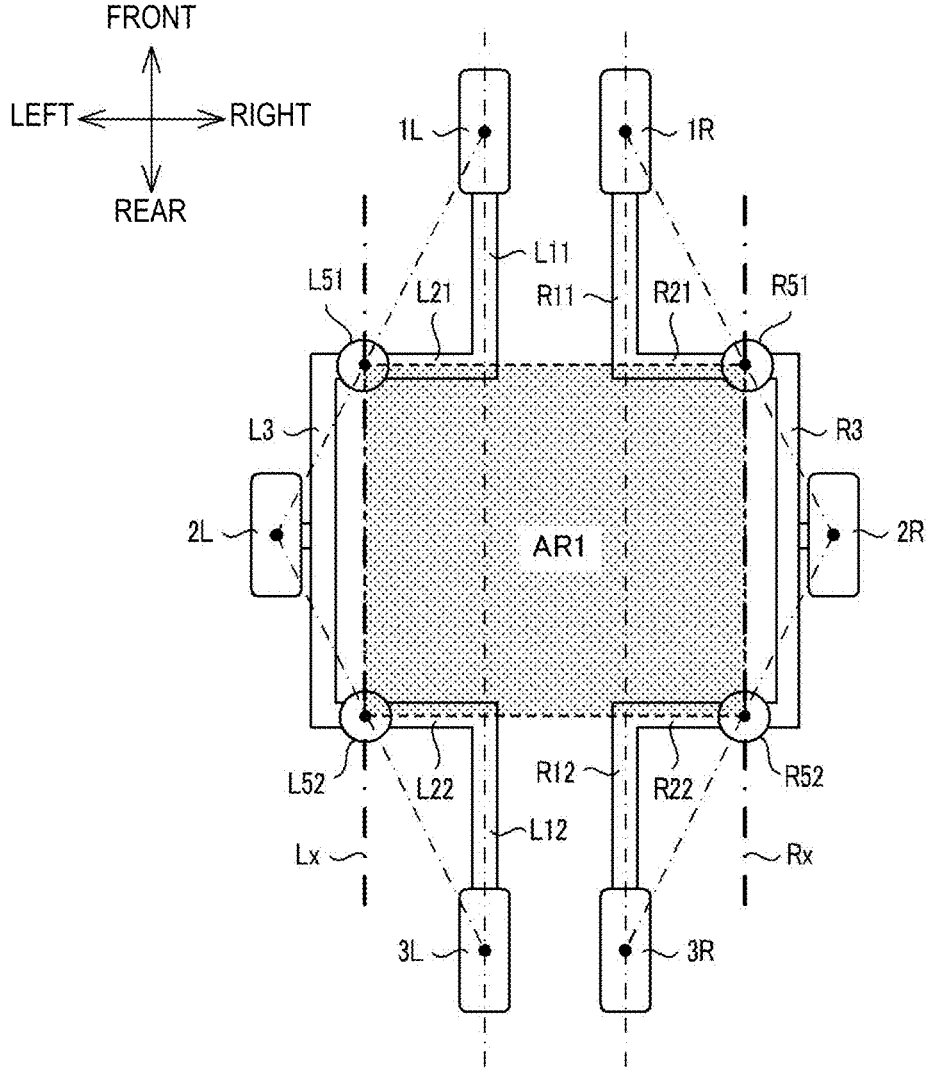
FIG. 12 is a plan view illustrating another example of the link mechanism of the traveling unit according to the embodiment of the present disclosure.

Here, a configuration for stabilizing the center of gravity of the traveling device 10 will be described. For example, as illustrated in FIG. 12, a triangle connecting the grounding points of the first left side wheel 1L, the second left side wheel 2L, and the third left side wheel 3L is generated, the front left side rotation member L51 is arranged at the intersection of the front side hypotenuse of the triangle and the second front left side link member L21, and the rear left side rotation member L52 is arranged at the intersection of the rear side hypotenuse of the triangle and the second rear left side link member L22. Similarly, a triangle connecting the grounding points of the first right side wheel 1R, the second right side wheel 2R, and the third right side wheel 3R is generated, the front right side rotation member R51 is arranged at the intersection of the front side hypotenuse of the triangle and the second front right side link member R21, and the rear right side rotation member R52 is arranged at the intersection of the rear side hypotenuse of the triangle and the second rear right side link member R22.

Figure 13:
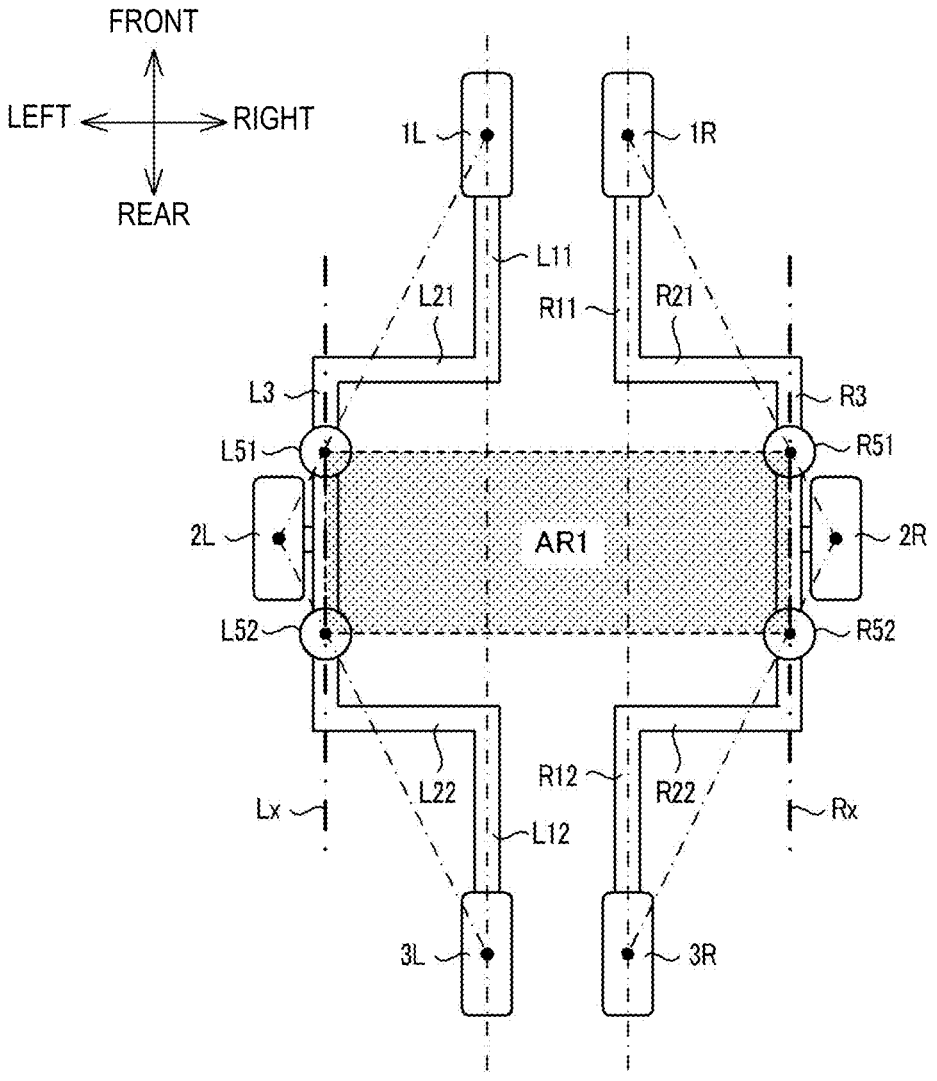
FIG. 13 is a plan view illustrating another example of the link mechanism of the traveling unit according to the embodiment of the present disclosure.

As another embodiment, for example, as illustrated in FIG. 13, a triangle connecting the grounding points of the first left side wheel 1L, the second left side wheel 2L, and the third left side wheel 3L is generated, the front left side rotation member L51 is arranged at the intersection of the front side hypotenuse of the triangle and the third left side link member L3, and the rear left side rotation member L52 is arranged at the intersection of the rear side hypotenuse of the triangle and the third left side link member L3. Similarly, a triangle connecting the grounding points of the first right side wheel 1R, the second right side wheel 2R, and the third right side wheel 3R is generated, the front right side rotation member R51 is arranged at the intersection of the front side hypotenuse of the triangle and the third right side link member R3, and the rear right side rotation member R52 is arranged at the intersection of the rear side hypotenuse of the triangle and the third right side link member R3.

As described above, by arranging the rotation member at the intersection of a side of a triangle connecting the grounding points of the wheels and the link member, it is possible to generate a region (rectangular range AR1) where a load can be loaded without impairing the stability of the center of gravity of the traveling device 10. The rectangular range AR1 corresponds to a region connecting the rotation members at the four points. That is, by loading the load in the rectangular range AR1, it is possible to cause the traveling device 10 to stably travel. Note that when the rectangular range AR1 is widened, the rotation members may be arranged at points where the area of the rectangular range AR1 is widened among points where the sides of the triangle intersect with the link members.

Here, the traveling device 10 (the traveling unit 1) may have a function of traveling along a guide member (e.g., a magnetic tape) arranged on the floor surface while detecting the guide member. In this case, in the traveling unit 1, the first left side wheel 1L and the first right side wheel 1R are arranged at an interval at which the traveling device 10 can travel across the guide member. This can prevent damage to the guide member because the traveling device 10 does not get on the guide member.

Supplementary Notes of Disclosure

Hereinafter, an outline of the disclosure extracted from the above-described embodiments will be described as supplementary notes. Note that configurations and processing functions described in the following supplementary notes can be selected and combined as desired.

Supplementary Note 1

A traveling device including:

a first left side wheel, a second left side wheel, and a third left side wheel arranged in a front-rear direction on a left side of a vehicle body;

a first right side wheel, a second right side wheel, and a third right side wheel arranged in a front-rear direction on a right side of the vehicle body;

a left side link member that connects the first left side wheel, the second left side wheel, and the third left side wheel; and a right side link member that connects the first right side wheel, the second right side wheel, and the third right side wheel, in which the left side link member includes a first left side link member extending in a front-rear direction, a second left side link member connected to the first left side link member and extending in a left-right direction, a third left side link member connected to the second left side link member, and a left side rotation member arranged on the second left side link member, the right side link member includes a first right side link member extending in a front-rear direction, a second right side link member connected to the first right side link member and extending in a left-right direction, a third right side link member connected to the second right side link member, and a right side rotation member arranged on the second right side link member, two of the first left side wheel, the second left side wheel, and the third left side wheel are connected to the first left side link member, and a remaining one is connected to the third left side link member, two of the first right side wheel, the second right side wheel, and the third right side wheel are connected to the first right side link member, and a remaining one is connected to the third right side link member, and the left side rotation member and the right side rotation member are attached to a frame of the vehicle body.

Supplementary Note 2

The traveling device according to Supplementary Note 1, in which the first left side wheel and the third left side wheel are connected to the first left side link member, and the second left side wheel is connected to the third left side link member, and the first right side wheel and the third right side wheel are connected to the first right side link member, and the second right side wheel is connected to the third right side link member.

Supplementary Note 3

The traveling device according to Supplementary Note 2, in which the first left side link member includes a first front left side link member arranged on a front side of the vehicle body and a first rear left side link member arranged on a rear side of the vehicle body, the second left side link member includes a second front left side link member arranged on a front side of the vehicle body and connected to front side ends of the first front left side link member and the third left side link member, and a second rear left side link member arranged on a rear side of the vehicle body and connected to rear side ends of the first front left side link member and the third left side link member, the left side rotation member includes a front left side rotation member arranged between one end and another end of the second front left side link member, and a rear left side rotation member arranged between one end and another end of the second rear left side link member, the first right side link member includes a first front right side link member arranged on a front side of the vehicle body and a first rear right side link member arranged on a rear side of the vehicle body, the second right side link member includes a second front right side link member arranged on a front side of the vehicle body and connected to front side ends of the first front right side link member and the third right side link member, and a second rear right side link member arranged on a rear side of the vehicle body and connected to rear side ends of the first front right side link member and the third right side link member, and the right side rotation member includes a front right side rotation member arranged between one end and another end of the second front right side link member, and a rear right side rotation member arranged between one end and another end of the second rear right side link member.

Supplementary Note 4

The traveling device according to Supplementary Note 3, in which the second left side wheel arranged between the first left side wheel and the third left side wheel and the second right side wheel arranged between the first right side wheel and the third right side wheel are driving wheels, and the first left side wheel, the third left side wheel, the first right side wheel, and the third right side wheel are driven wheels.

Supplementary Note 5

The traveling device according to supplementary note 4, in which the second left side wheel is arranged further on a left side of the vehicle body than the first left side wheel and the third left side wheel with respect to a traveling direction, and the second right side wheel is arranged further on a right side of the vehicle body than the first right side wheel and the third right side wheel with respect to a traveling direction.

Supplementary Note 6

The traveling device according to any of Supplementary Notes 3 to 5, in which the front left side rotation member and the rear left side rotation member are rotatable with respect to the vehicle body about a common left side rotation shaft extending in a front-rear direction, and the front right side rotation member and the rear right side rotation member are rotatable with respect to the vehicle body about a common right side rotation shaft extending in a front-rear direction.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A traveling device comprising:

a first left side wheel, a second left side wheel, and a third left side wheel arranged, in this stated order, in a front rear direction on a left side of a vehicle body;

a first right side wheel, a second right side wheel, and a third right side wheel arranged, in this stated order, in the front-to-rear direction on a right side of the vehicle body;

a left side link member that connects the first left side wheel, the second left side wheel, and the third left side wheel; and a right side link member that connects the first right side wheel, the second right side wheel, and the third right side wheel, wherein:

the left side link member includes:

a first left side link member extending in the front-to-rear direction, and connected to the first left side wheel and the third left side wheel, wherein the first left side link member includes a first front left side link member arranged on a front side of the vehicle body, and a first rear left side link member arranged on a rear of the vehicle body, a second left side link member connected to the first left side link member and extending in a left-to-right direction, wherein the second left side link member includes a second front left side link member arranged on the front side of the vehicle body and connected to front side ends of the first front left side link member and the third left side link member, and a second rear left side link member arranged on the rear side of the vehicle body and connected to rear side ends of the first front left side link member and the third left side link member, a third left side link member connected to the second left side link member, and to the second left side wheel, and a left side rotation member arranged on the second left side link member, and including a front left side rotation member arranged between two ends of the second front left side link member, and a rear left side rotation member arranged between two ends of the second rear left side link member, the right side link member includes:

a first right side link member extending in the front-to-rear direction, and connected to the first right side wheel and the third right side wheel, wherein the first right side link member includes a first front right side link member arranged on the front side of the vehicle body, and a first rear right side link member arranged on the rear side of the vehicle body, a second right side link member connected to the first right side link member and extending in the left-to-right direction, wherein the second right side link member includes a second front right side link member arranged on the front side of the vehicle body and connected to front side ends of the first front right side link member and the third right side link member, and a second rear right side link member arranged on the rear side of the vehicle body and connected to rear side ends of the first front right side link member and the third right side link member, a third right side link member connected to the second right side link member, and to the second right side wheel, and a right side rotation member arranged on the second right side link member, and including a front right side rotation member arranged between two ends of the second front right side link member, and a rear right side rotation member arranged between two ends of the second rear right side link member, and wherein:

two of the first left side wheel, the second left side wheel, and the third left side wheel are connected to the first left side link member, and a remaining one is connected to the third left side link member, two of the first right side wheel, the second right side wheel, and the third right side wheel are connected to the first right side link member, and a remaining one is connected to the third right side link member, and the left side rotation member and the right side rotation member are attached to a frame of the vehicle body.

2. The traveling device according to claim 1, wherein the second left side wheel, arranged between the first left side wheel and the third left side wheel, and the second right side wheel, arranged between the first right side wheel and the third right side wheel, are driving wheels, and the first left side wheel, the third left side wheel, the first right side wheel, and the third right side wheel are driven wheels.

3. The traveling device according to claim 2, wherein the second left side wheel is arranged further left on a left side of the vehicle body than the first left side wheel and the third left side wheel, with respect to a traveling direction, and the second right side wheel is arranged further right on a right side of the vehicle body than the first right side wheel and the third right side wheel, with respect to the traveling direction.

4. The traveling device according to claim 1, wherein the front left side rotation member and the rear left side rotation member are rotatable, with respect to the vehicle body, about a common left side rotation shaft extending in the front-to-rear direction, and the front right side rotation member and the rear right side rotation member are rotatable, with respect to the vehicle body, about a common right side rotation shaft extending in the front-to-rear direction.

* * * * *